United States Patent [19]

Olds

[11] 4,351,054

[45] Sep. 21, 1982

[54] OPTIMIZED MIXING AND MELTING ELECTRIC FURNACE

[75] Inventor: Leonard E. Olds, Castle Rock, Colo.

[73] Assignee: Manville Service Corporation, Denver, Colo.

[21] Appl. No.: 240,514

[22] Filed: Mar. 4, 1981

[51] Int. Cl.³ .............................................. C03B 5/027
[52] U.S. Cl. ........................................ 373/38; 373/40
[58] Field of Search .................................. 13/6, 23, 24

[56] References Cited

U.S. PATENT DOCUMENTS

2,089,690  8/1937  Cornelius ...................................... 13/6
3,983,309  9/1976  Faulkner et al. ........................... 13/6

*Primary Examiner*—Roy N. Envall, Jr.
*Attorney, Agent, or Firm*—Robert M. Krone; Joseph J. Kelly; Richard K. Thomson

[57] ABSTRACT

An electric melting furnace is provided for optimally melting and mixing a non-homogeneous material. The melting furnace includes a vessel having its top portion open to the environment. Three electrodes are supported above the furnace. Each of the electrodes includes a tip for insertion into the material contained in the vessel. The vessel further includes an outlet formed in the bottom wall of the vessel to discharge the material after it has been melted and optimally mixed. Each of the three electrode tips has a generally round configuration. During the melting operation, the three electrode tips are laterally spaced from each other and are positioned in the vessel to be surrounded by molten material but above the bottom wall outlet. Optimum melting and then optimum mixing of the material occurs at selected horizontal spacings of the electrode tips and at selected electrode tip immersions in the molten material. The lateral spacing of the electrode tips and the immersion thereof depends upon a number of conditions including the width or diameter of the vessel, the magnitude of power applied to the electrodes, and the desired temperature of the molten material contained in the vessel.

8 Claims, 17 Drawing Figures

OPTIMIZED MIXING AND MELTING ELECTRIC FURNACE

FIELD OF THE INVENTION

The present invention relates to electric melting furnaces for melting and mixing oxide materials, such as glass and refractory compositions. In particular, the present invention pertains to an electric melting furnace wherein electrodes are spaced from each other and immersed in a molten material according to a selected arrangement to provide optimum melting and mixing of oxide materials.

BACKGROUND ART

Various high temperature electric melting furnaces with differently configured electrodes have been devised for melting glass and refractory materials. In U.S. Pat. No. 3,983,309 to Faulkner et al., a melting furnace is disclosed which includes three rectangular or plate block electrodes inserted into the furnace from above. The outlet of the furnace includes an electrically conducting member. The three plate electrodes are spaced radially from the electrically conducting outlet member. The electrodes are laterally adjustable for altering melting conditions. In U.S. Pat. No. 3,539,691 to Lucek, a forehearth is described having two electrodes for overhead entry into melted material. The electrodes provide supplemental heat to maintain the material in a melted condition. The forehearth has a top covering or cap to prevent the escape of heat. In U.S. Pat. No. 2,686,821 to McMullen, a furnace is provided having a forehearth. Cylindrical carbon electrodes are mounted for positioning through the open top furnace. The position of the electrodes is vertically adjustable. In U.S. Pat. No. 2,089,690 to Cornelius, an electric furnace is illustrated wherein round tip electrodes are positioned into the furnace through the side walls thereof. In U.S. Pat. No. 2,591,709 to Lubatti, an electrode is shown including a lining or covering which surrounds a portion of the cylindrical shaft of the electrode.

Although numerous and diverse furnaces are shown in the prior art, none of these prior art furnaces have incorporated the structure of the present invention for optimizing both the melting and mixing of a non-homogeneous material prior to its discharge from a furnace outlet. The present invention incorporates electrodes having substantially round electrode tips which are insertable through the top of an opened furnace vessel having a bottom discharge outlet. Critical to efficient melting and mixing of the material in the furnace vessel is the spacing between each of the electrode tips and the depth thereof in the molten material.

As evidenced by U.S. Pat. No. 3,983,309 to Faulkner et al., laterally adjustable electrodes positioned through the top of the furnace are known. But, these electrodes have rectangular plate electrode tips positioned radially outwardly from the furnace outlet in the same plane thereof. When rectangular plate electrodes with an electrically conducting outlet are used as in the electric furnace of Faulkner et al., radial heat flow patterns are produced. The radial heat flow produced by electric current through the electrodes is in a direction away from the center of the furnace towards the side walls of the furnace. As a result, significant amounts of heat are lost to the furnace side walls, rather than being used to melt the material in the furnace. In contrast, the round or circular electrode tips of the present invention create circular flow patterns which results in the heat being maintained in the center of the furnace. As a consequence, rapid heat absorption by batch overlying the melted material is achieved in the furnace. Additionally, the circular flow patterns enhance mixing or agitation of the molten material so that a homogeneous material is discharged from the furnace vessel.

Even more significant, unlike the furnace of U.S. Pat. No. 3,983,309, the electrodes of this invention are spaced from each other and immersed a vertical distance in the molten material based upon defined furnace conditions, including the size of the furnace vessel, the magnitude of power applied to the furnace, and the temperature of the molten material in the furnace.

U.S. Pat. No. 3,539,691 to Lucek does show at least one round electrode tip in a two electrode furnace configuration. However, the Lucek electrodes are used in a forehearth, and not an electric melting furnace. The forehearth includes a cover so that the molten material is not open to the environment. A forehearth having a top closed to the surrounding environment is essential to prevent the unwanted escape of heat from the fully melted material before it exits the discharge outlet. In addition, forehearth electrodes are used to maintain the molten condition of the material contained therein. There is no additional melting or mixing thereof in the forehearth, unlike the present invention wherein optimum mixing of the molten material is a salient feature.

SUMMARY OF THE INVENTION

In accordance with the present invention, an electric melting furnace is provided. The electric furnace includes a vessel for containing materials to be melted and mixed together. The vessel has a top portion open to the atmosphere or environment which surrounds the opened vessel. The vessel also has an outlet formed in a bottom wall thereof. The outlet permits discharge of the material after it has been optimally melted and mixed. The electric furnace further includes three electrodes supported above the top portion of the vessel. Each of the electrodes is supported by a mounting apparatus. The mounting apparatus is movable in both a horizontal direction and a vertical direction. When the mounting apparatus is activated to move in a horizontal direction, the lateral spacing of the electrode relative to the furnace vessel is adjusted. Similarly, when the mounting apparatus is activated to move in a vertical direction, there is an adjustment of the vertical position of the electrode in the molten material.

Each of the three electrodes includes a generally cylindrically configured shaft and a round tip joined to the shaft. Each of the three electrodes also has a hollowed longitudinally extending center portion for receiving a fluid to cool the electrode when the electrode is placed in the molten material. A portion of the electrode shaft and the electrode tip enter the furnace vessel through the open top portion thereof.

During the material melting and mixing process, a non-homogeneous batch is continuously present on the upper surface of the molten material or melt line. Each of the electrode tips is positioned beneath the melt line within the molten material but above the bottom wall outlet. A portion of the electrode shaft remains above the upper surface of the batch. The vertical distance or immersion of each of the electrode tips within the molten material is selected for maximizing the melting and mixing of the material. Concomitantly, the vertical distance of the electrode tip above the bottom wall outlet is selected to optimize the melting and mixing process. The lateral distance or spacing between each of the electrode tips is also selected to maximize the melting and mixing of the material contained in the vessel. This optimum immersion and lateral spacing of the electrode tips depends upon a number of furnace parameters. These parameters include the size of the furnace vessel, the magnitude of power applied to the furnace, and the desired working temperature of the furnace vessel. A source of electric power is connected to each of the electrodes for generating an electrical current which flows among the electrode tips and through the material to properly melt and mix the material. While the outlet formed in the vessel bottom wall is made from an electrically conductive metal, the outlet, preferably, does not conduct significant amounts of electrical current. The optimized melting and mixing of the material in the vessel results in an increased flow rate of molten material from the furnace vessel and in an efficient production of a homogeneous product, such as fiber, as the molten material is discharged from the furnace outlet.

In view of the foregoing, a number of worthwhile objectives of the present invention are achieved.

An object of this invention is to increase the flow rate of molten material from the furnace vessel.

Another related object is to improve the production efficiency of fibrous material.

A further and related object of the present invention is to provide an open top furnace vessel so that electrodes can be inserted into the vessel from above.

A further related object of the invention is to provide an open top vessel to permit lateral movement of electrodes relative to the furnace vessel and vertical movement of the electrodes in order to adjust their immersion in the molten material.

Yet still another related object of this invention is to provide lateral spacing adjustment and vertical adjustment of the electrodes in order to maximize the melting and mixing of the material for a given vessel size, for a given magnitude of power applied to the electrodes, and for a desired working temperature of the vessel.

Yet an additional object of this invention is to provide round electrode tips for creating circular heat flow patterns to minimize loss of heat to the vessel side walls.

Additionally, another object of the present invention is to provide vertical movement of the electrodes so that the electrode tips are positioned above the vessel outlet and so that the vessel outlet essentially does not act as a conductor of significant amounts of electrical current.

DETAILED DESCRIPTION OF THE PREFERRED EMBODIMENTS

Figure 1:
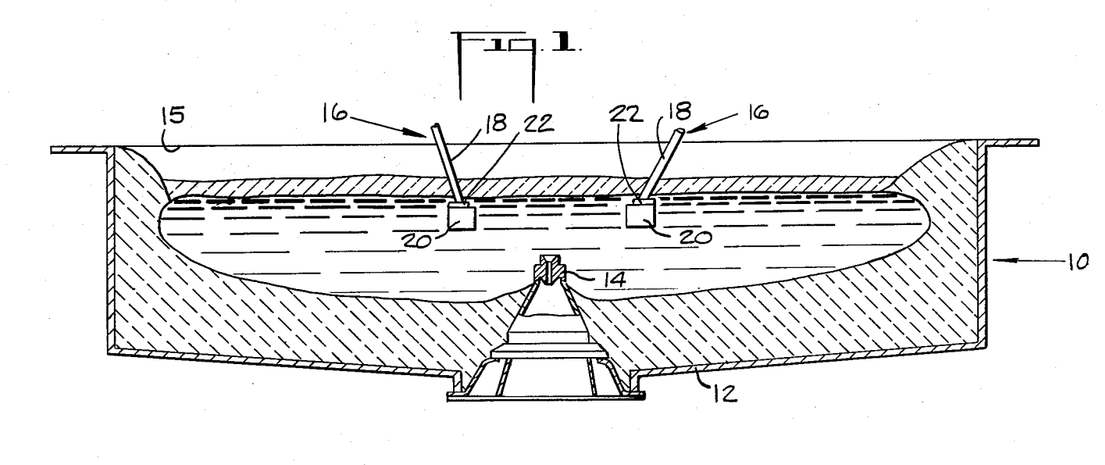
FIG. 1 is a vertical cross-section of the electric furnace of the present invention showing the position of the electrodes in the furnace vessel with an electrode mounting apparatus cutaway.
Figure 2:
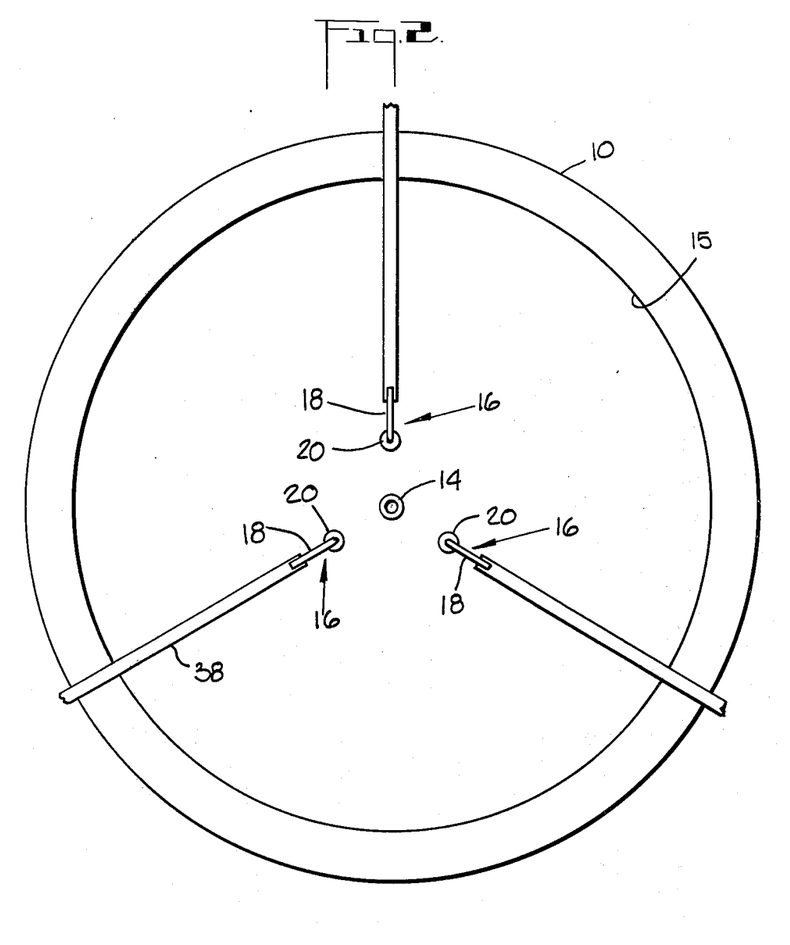
FIG. 2 is a top plan view of the electric furnace of FIG. 1 showing the three-electrode arrangement of the present invention.

In accordance with the present invention, an electric furnace is provided, as shown in FIGS. 1 and 2. The furnace includes a vessel or container 10 for housing molten material and batch. The batch overlies the upper surface or melt line of the molten material. At least ¼-inch of batch overlies the molten material. Preferably, the batch layer is at least ½-inch thick to assure that the heat escaping from the molten material is efficiently absorbed by the batch to facilitate the melting thereof.

The vessel 10 has a standard outer metal shell which can be cooled by conventional means. Contiguously adjacent the inner wall of the shell is a suitable refractory material compatible with the material being melted in the vessel 10. It is understood that the refractory material can be a skull which has been formed from molten material. The vessel 10 also has a bottom wall 12 with a discharge outlet 14 formed therein. A top portion 15 of vessel 10 is not covered. Rather, the top portion 15 is open to the atmosphere or environment above the vessel 10. As will be discussed in detail later, the open top vessel 10 permits lateral and vertical movement of electrodes which are positioned in the vessel 10. In addition, the opn top portion 15 allows for the continuous delivery of batch to the furnace during the melting process.

Figure 3:
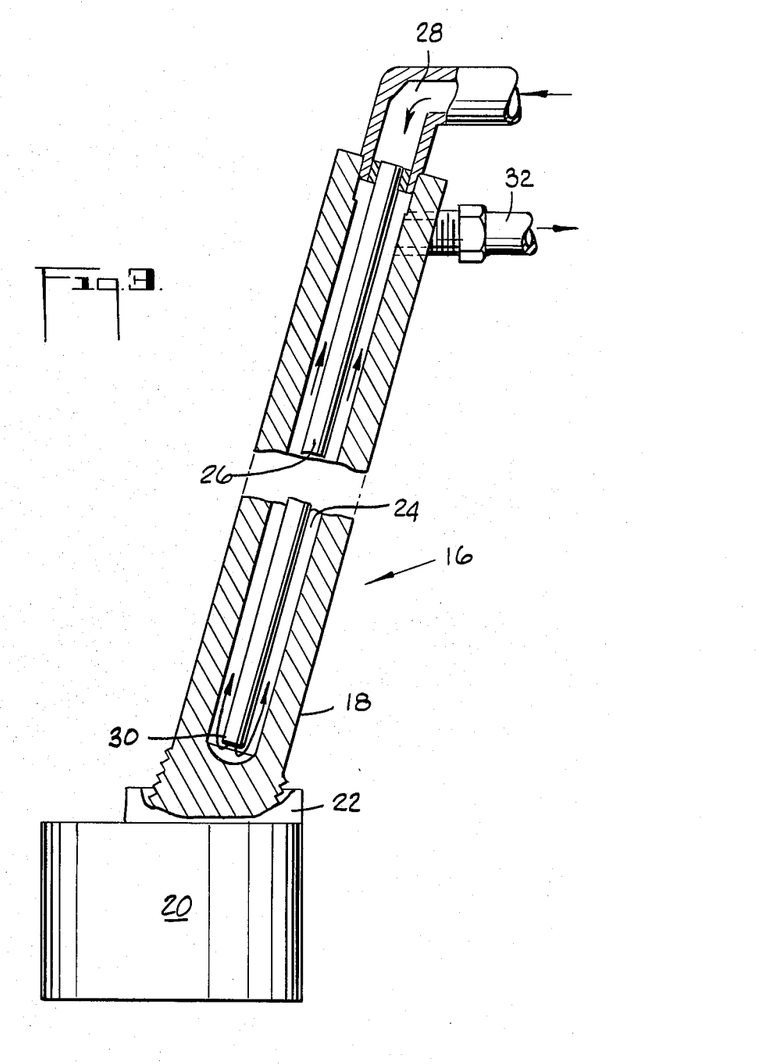
FIG. 3 is an enlarged, longitudinal section showing the electrode of the present invention.

The electric furnace further includes three electrodes 16, as shown in FIG. 2, with each electrode connected to a suitable source of power by means of power lines 17. A representative electrode 16 is best illustrated in FIG. 3. Each electrode 16 includes a generally cylindrically configured shaft 18 and a substantially round circular tip 20 threaded or otherwise joined to the shaft 18 at its lower end. The electrode shaft 18 is obliquely joined to the electrode tip 20. When the electrode tip 20 is positioned in the molten material, the plane of the electrode tip 20 is substantially parallel to the vessel top portion 15. In the preferred embodiment, the diameter of the electrode tip is greater than the diameter of the lateral cross section of the shaft 18. The diameter of the electrode tip 20 is normally in a range of three-nine inches.

A collar 22 surrounds a portion of shaft 18 located above and adjacent to the electrode tip 20. The collar 22 is preferably loosely fitted to surround the shaft portion in order to protect that portion of shaft 18 from rapid errosion due to the high temperature of the molten material. The collar 22 also acts to reduce the rate of loss of electrode tip material.

The electrode shaft 18, electrode tip 20 and collar 22 are good electric conductors and are made, preferably, from a refractory metal material such as molybdenum, tungsten, platinum, or alloys thereof.

Each electrode 16 also has a hollowed channel 24 formed through a substantial center portion of the longitudinal extent of the shaft 18. A pipe 26 is fixedly positioned within the channel 24. A cooling fluid, such as water, is supplied to pipe 26 and channel 24 when the electrode 16 is positioned in the molten material. The cooling fluid protects the electrode 16 from unwanted electrode material deterioration. Further, heat loss from the molten material to the cooled electrode 16 is reduced by properly controlling the flow rate of cooling fluid to the electrode 16. The cooling fluid is received from inlet tube 28 by the pipe 26. The cooling fluid exits pipe end 30. Pipe end 30 is vertically spaced at least ½-inch above the bottom of channel 24 to minimize the forming of vaporized cooling fluid, such as steam, which would block the efficient passage of the cooling fluid to the channel 24. The cooling fluid is discharged from the channel 24 by means of outlet tube 32. In the preferred embodiment, the channel 24 has a diameter less than or equal to ¾-inch in order to minimize the loss of heat to the electrode 16.

Figure 4:
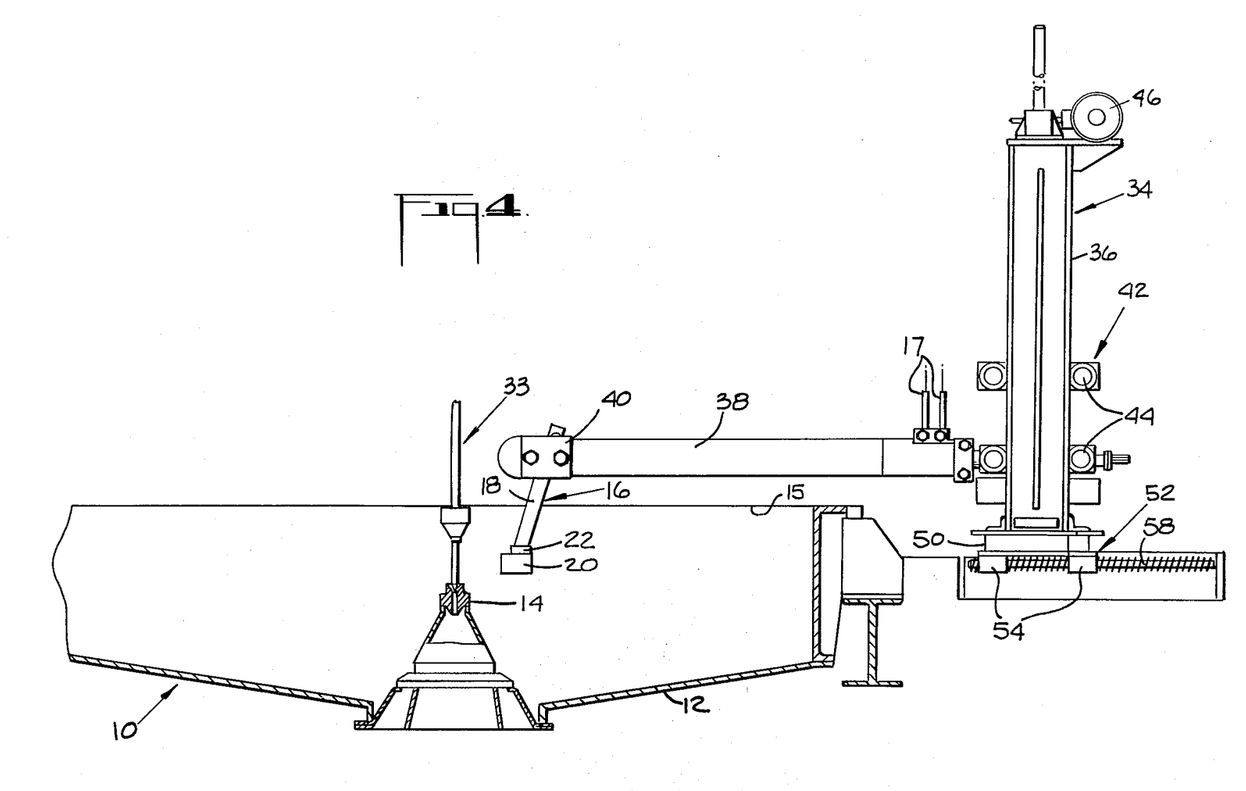
FIG. 4 is a vertical cross-section of the present invention showing a portion of the electric furnace together with the electrode mounting apparatus.

The electric furnace also includes a well-known needle assembly 33, as depicted in FIG. 4. The needle assembly 33 is supported above the vessel 10 for movement in a vertical direction and is used in the controlling of the opening and closing of outlet 14. Also shown in FIG. 4 is an apparatus 34 for mounting and supporting an electrode 16. An identical mounting apparatus 34 is positioned at a convenient location around the furnace vessel 10 for mounting each electrode 16. The mounting apparatus 34 also provides for the horizontal and vertical adjustment of the electrode 16 relative to the vessel 10. The mounting apparatus 34 includes a vertical frame 36. A support arm 38 extends normal to the vertical frame 36. A conventional electrode clamping device 40 is bolted or otherwise fastened to a first end of the support arm 38. The clamping device 40 is positioned above the top portion 15 of vessel 10. The electrode 16 is connected to the clamping device 40.

A vertical carriage 42 having wheels 44 is supported by the vertical frame 36 for movement in a vertical direction therealong. A second end of support arm 38 is fastened to the vertical carriage 42. A motor 46 drives the vertical carriage 42 to enable vertical movement of the support arm 38 and, as a result, adjustment of the electrode 16 in a vertical direction is provided.

The apparatus 34 further includes a horizontal frame 50 which is connected to the bottom side of the vertical frame 36. Supported for movement in a horizontal or lateral direction along the horizontal frame 50 is a horizontal carriage 52. Horizontal carriage 52 includes bushings 54. A central threaded shaft 58 is attached to a suitable location on the horizontal carriage 52. The ends of the threaded shaft 58 are supported in bearing blocks (not shown). Rotation of the threaded shaft 58, one way or the other, produces two-directional horizontal movement of the horizontal carriage 52 and, as a consequence, electrode 16 is moved in a horizontal direction relative to the vessel 10. The rotation of the threaded shaft 58 is accomplished using a standard motor in a conventional manner and which can be enabled by an operator of the electric furnace.

This capability of readily adjusting electrodes 16, in both a vertical direction and a horizontal direction, is important to the discharge of a thermally and chemically uniform molten material from the electric furnace outlet 14. In particular, the electric furnace of the present invention can provide uniform molten material for use in the production of fibers. The molten material exiting the bottom wall outlet 14 is fed to conventional rotating spinners (not shown) which produce fibers.

Efficient fiber production is directly dependent upon the uniformity or homogeneity of the molten material and the temperature thereof. The more uniform the molten material, the larger is the percentage of discharged molten material which is properly converted to fiber by the spinners. Concomitantly, the amount of molten material not properly converted to useful fiber is minimized.

The discharge of uniform molten material is maximized through the selected vertical and horizontal positioning of each of the electrodes 16, in combination with the application of the proper magnitude of power to the furnace and the selection of the desired working temperature of the molten material. The importance of these conditions is best understood by means of a discussion of the graphs illustrated in FIGS. 5A–5F, 6A–6F and 7. These graphs were derived as a result of testing of the electric furnace described herein and further as a result of an extrapolation of the data obtained from the testing.

The material melted in the vessel 10 during the testing was comprised of 54% of $SiO_2$ and 46% of $Al_2O_3$. The range of molten material working temperature was 3500°–3800° F. The diameter of each of the electrode tips was about four inches.

Before a discussion of the graphs is undertaken, definitions of relevant terms pertinent to a discussion thereof are provided:

Spinner Efficiency is a ratio (expressed as a percentage) of the weight of molten material discharged from the vessel outlet onto a spinner and then collected as useful fibrous product to the total weight of molten material discharged from the vessel outlet.

Electrode Spacing is the lateral distance from the center of one electrode to the center of another electrode. (With respect to the discussion of FIGS. 5A–5F, 6A–6F and 7, the lateral distance between each of the electrodes remains the same, e.g., an electrode spacing of 35 inches indicates that each of the electrodes is 35 inches from each of the other two electrodes).

Immersion is the vertical distance from the melt line in the furnace vessel to the bottom of the electrode tip. (With respect to the discussion of FIGS. 5A–5F, 6A–6F and 7, the vertical distance of each electrode remains the same, e.g., an immersion of 6 inches indicates that each of the electrodes has an immersion of 6 inches).

Power is the rate at which electric energy is applied to the three electrodes.

Power Density is the average magnitude of power developed in a cross sectional area within the metal shell of a furnace vessel and is expressed in $Kw/Ft^2$. (With respect to the testing herein, the furnace vessel has a cross-sectional area of 52.8 sq. ft. with a radius of 4.1 ft).

Electrode Spacing Using Furnace Radius is a ratio (expressed as a percentage) of the lateral distance, from the center vertical axis of the furnace vessel to the center of the electrode tip, to the radius of the furnace vessel.

Melt Stream Temperature is the actual temperature of the molten material as it exits the vessel outlet.

Optical Stream Temperature is the temperature of the molten material as measured by a standard "hot wire" optical pyrometer. The relation of the Melt Stream Temperature to the Optical Temperature is expressed by a relationship involving the well-known emittance factor.

Working Temperature is the temperature of the molten material having a value greater than the Melt Stream Temperature in order to provide a practical melting operation. For example, with refractory materials, the Working Temperature must be approximately 100°–300° F. above the highest equilibrium melting point of the molten material composition. The highest equilibrium melting points of various compositions are readily obtainable by one skilled in the art.

Figure 5A:
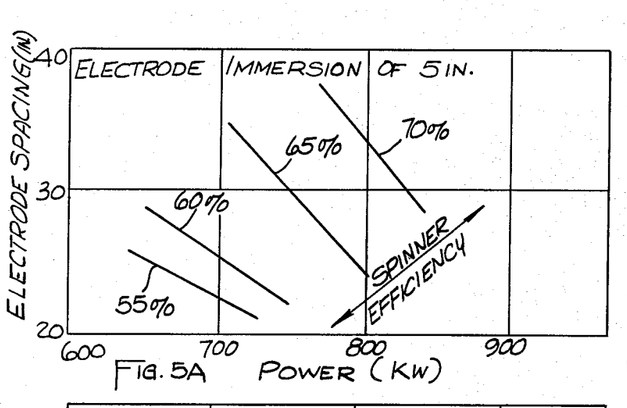
FIGS. 5A-5F are plots showing fiber spinner efficiencies at various electrode tip spacings and immersions together with different power applications at a working temperature range of 3500°-3800° F.
Figure 5B:
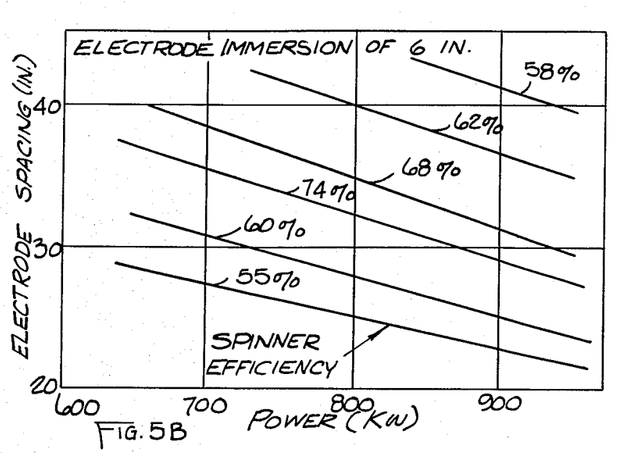
Figure 5C:
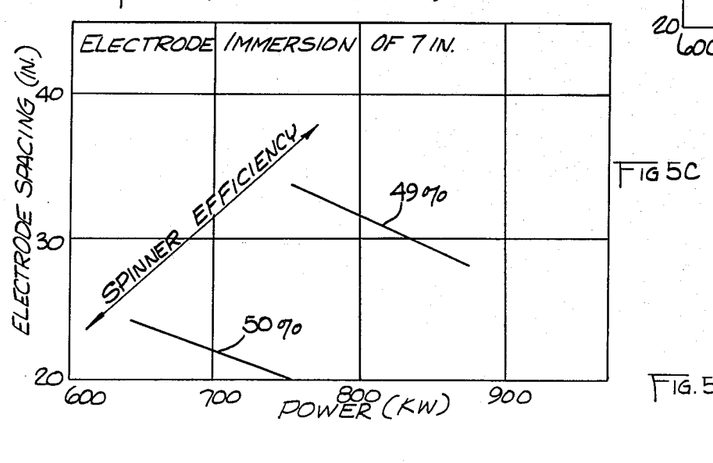

Referring now to FIGS. 5A–5F, FIGS. 5A–5C illustrate various spinner efficiencies which result as the electrode tip immersion, electrode spacing, and power are varied in the vessel 10 having a 4.1 ft. radius. FIG. 5A indicates that, at a five-inch immersion of each electrode tip, spinner efficiency generally increases with increasing electrode spacing and increasing power. FIG. 5C indicates that, at a seven-inch immersion of each electrode tip, spinner efficiency generally decreases with increased electrode spacing and increased power. FIG. 5B indicates that, at six-inch immersion of each electrode tip, spinner efficiency increases with increasing electrode spacing and increasing power but spinner efficiency then decreases with increasing electrode spacing and increasing power.

Figure 5D:
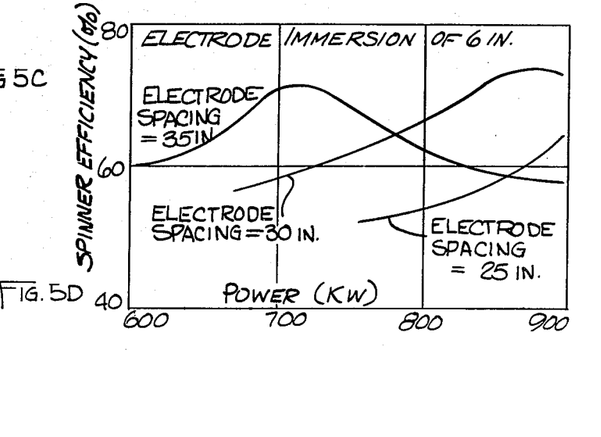
Figure 5E:
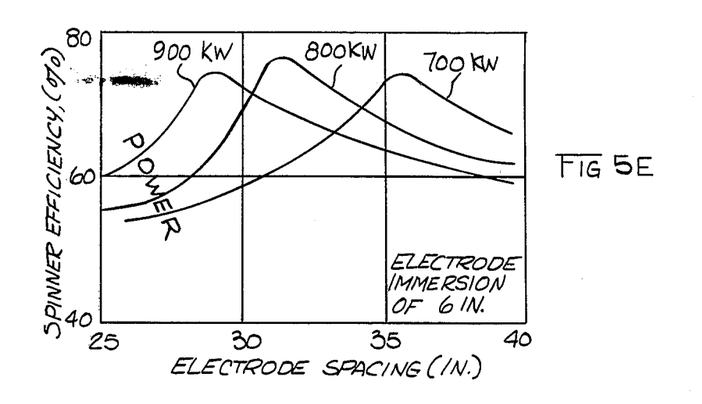
Figure 5F:
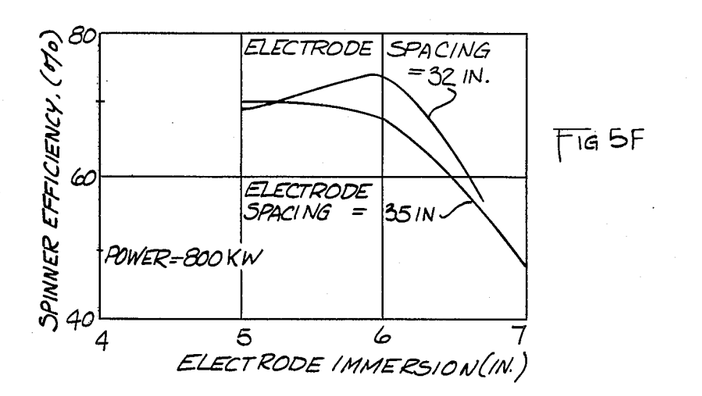

FIGS. 5D and 5E provide plots of various electrode spacings and power to the vessel at 6-inch electrode immersion and their effect on spinner efficiency. FIG. 5F indicates that spinner efficiency decreases with an increase in immersion from six inches. As a consequence, if the melt line should rise after the immersion is initially set at six inches, reduced spinner efficiency is expected.

Based on the graphs of FIGS. 5B and 5E, an optimum electrode tip immersion of six inches is found. Specifically, at an electrode tip immersion of six inches, the greatest spinner efficiency is achieved at selected electrode spacing and power. For example, a 74% spinner efficiency is achieved at a six-inch electrode tip immersion, when the electrode spacing is approximately thirty-two inches while the magnitude of power applied to the electrodes is approximately 800 Kw.

In addition to the improved spinner efficiency, another measurement of increased fiber production in the electric furnace herein is the significant increase in the flow rate of molten material from the vessel outlet 14 due to the optimized electrode spacing and immersion. During about 1,050 hours of testing, using optimized electrode spacing and electrode immersion at 820 Kw of power applied to the vessel 10 and on a zero downtime basis, an average flow rate of 915 lb/hr of molten material from the vessel outlet 14 was achieved. In contrast, the typical flow rate at 820 Kw on a zero down-time basis of a furnace having plate block electrodes, radially spaced relatively near a center conducting electrode outlet, was about 523 lb/hr.

Figure 6A:
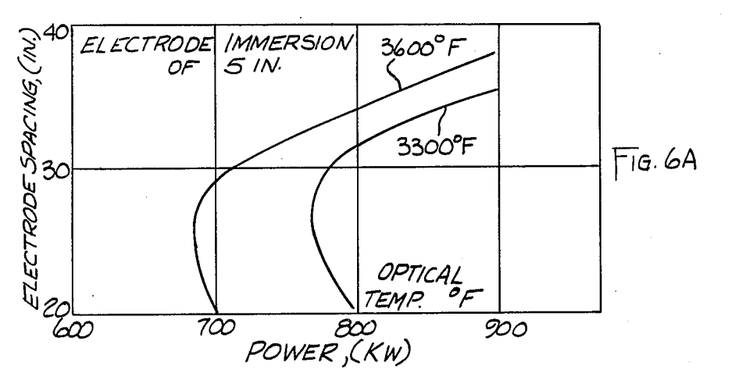
FIGS. 6A-6F are plots showing furnace vessel optical temperatures using various electrode tip spacings and immersions together with different power applications.
Figure 6B:
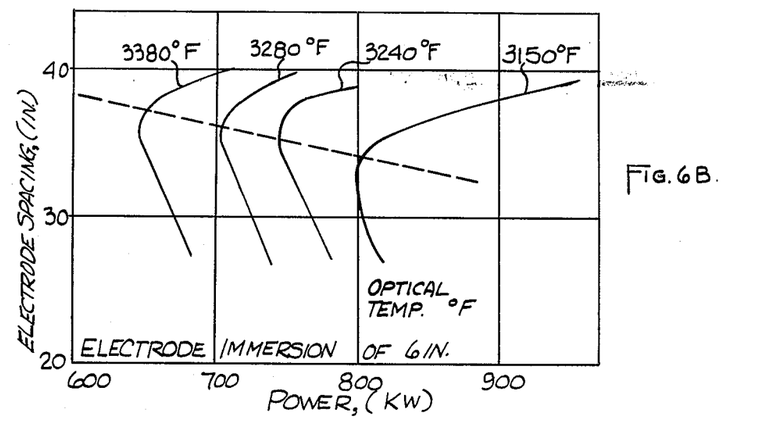
Figure 6C:
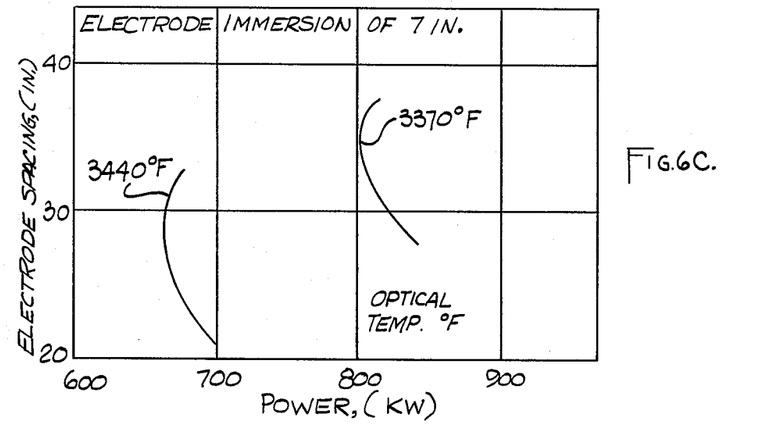
Figure 6D:
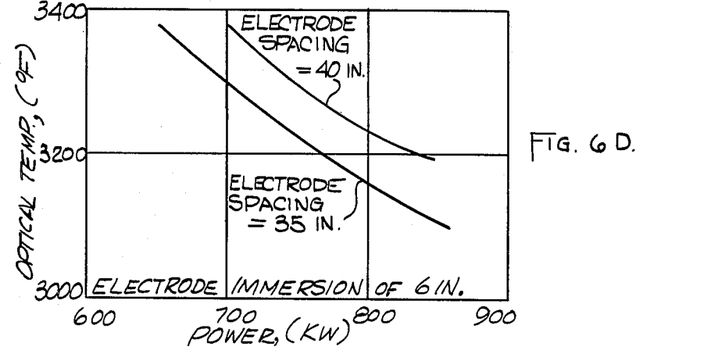
Figure 6E:
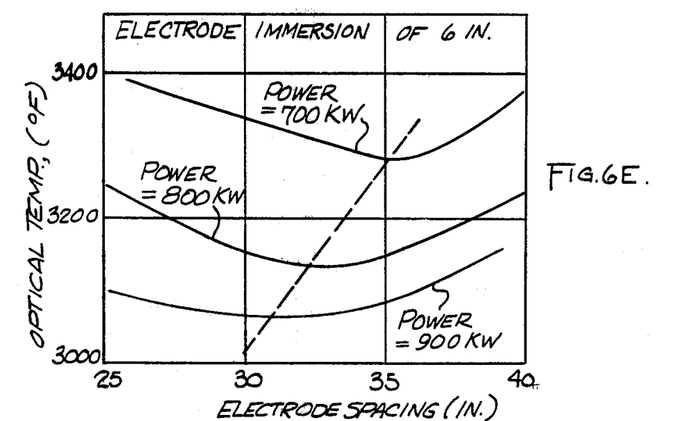
Figure 6F:
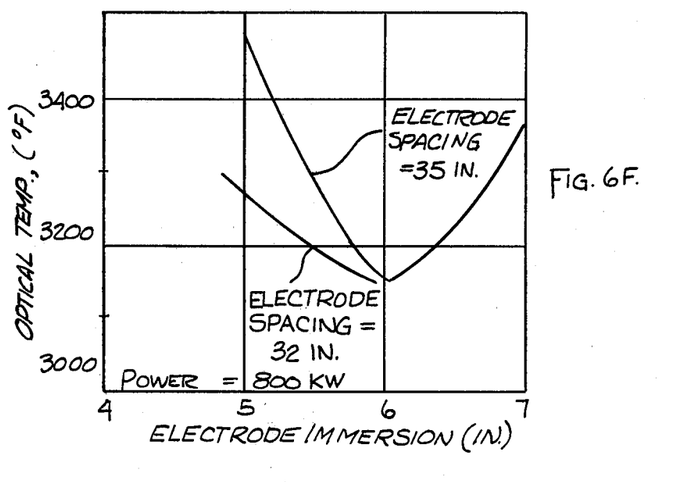

FIGS. 6A–6C illustrate the relationship of power and electrode spacing for three different, fixed electrode immersions when the optical temperature is held substantially fixed at a number of different temperatures. FIGS. 6A–6C indicate that, at fixed immersions of five, six, and seven inches of each electrode, the optical temperature decreases with increasing power. FIGS. 6D and 6E provide plots of various electrode spacings and power to the vessel at 6-inch electrode immersion and their effect on optical temperature. Further, FIG. 6E indicates that, at different fixed magnitudes of power with six inch immersion, a minimum optical temperature is found for each fixed power as electrode spacing is varied.

A comparison of FIG. 5E with FIG. 6E reveals that a previously unestablished relation exists between spinner efficiency and the optical temperature of the discharged molten material. Specifically, maximum spinner efficiency and the lowest optical temperature measurement are found at the same electrode spacing, the same magnitude of power applied to the furnace, and the same electrode immersion. Although FIG. 6E indicates that optical temperature of the molten material decreases with increasing magnitude of power applied, the actual melt stream temperature increases with increasing power since the emittance of the molten material decreases with increasing power.

Figure 7:
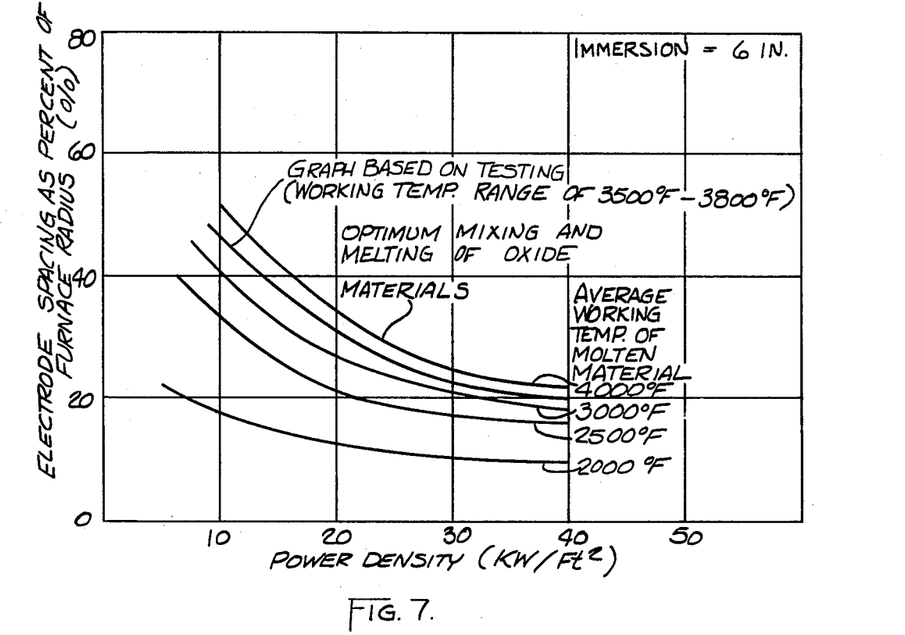
FIG. 7 is a plot extrapolated from FIGS. 5A-5F and 6A-6F and data obtained as a result of the testing of the electric furnace of the present invention and showing conditions of optimized mixing and melting.

The interrelationship in the electric furnace of the factors of electrode tip spacing, power to the three electrodes, electrode tip immersion, molten material working temperature and vessel size are summarized and illustrated in FIG. 7. The graphs of FIG. 7 are extrapolated from the graphs of FIGS. 5D, 5E and 6E and illustrate average conditions of optimum melting and mixing of oxide materials in an electric furnace. The graph having the working temperature range of 3500°–3800° F. is based directly on the data obtained during the electric furnace testing. The graphs having the average working temperatures of 2000° F., 2500° F., 3000° F. and 4000° F. are based on an extrapolation of the tested data. The data of FIGS. 5-E and 6-E indicates that decreasing electrode spacing requires increasing power for optimum melting and mixing. It is known that the effect of melting oxide compositions having a lower working temperature range is comparable to that which occurs when power to the electrodes is increased. Specifically, decreasing working temperatures for oxide compositions having lower working temperatures also requires decreasing of the electrode spacing in order to maintain optimum melting and mixing. The graphs of FIG. 7 represent this conclusion.

Instantaneous conditions for optimum material mixing and melting may vary relative to the average conditions. The instantaneous optimum varies because of a number of factors including uneven batch distribution over the molten material, imbalances in the 3-phase power through the electrodes, and a melt line which may deviate from its initial position in the vessel 10.

Optimum melting and mixing of the oxide materials translates into maximum spinner efficiency since the discharged material is homogeneous and properly melted. By way of example and illustrating the application of FIG. 7, in the range of working temperatures of the molten material between 3500°–3800° F. and with a power density of 13 Kw/Ft$^2$, having an electrode tip immersion of six inches for each of the electrodes, and a spacing of each of the electrode tips a distance of approximately 42% of the radius of the furnace vessel results in optimum molten material mixing and melting.

In FIG. 7 power is expressed in terms of power density so that any width or diameter vessel is represented by the graph. With respect to a furnace vessel having a cross-sectional area of 52.8 sq. ft., 686 Kw are applied to the three electrodes (13 Kw/Ft$^2 \times$ 52.8 sq. ft.). Similarly, electrode spacing is expressed as a percentage of the radius of the vessel, rather than the distance between electrodes, so that any width or diameter vessel is represented by the graph. With respect to a furnace vessel having a radius of 4.1 ft. and a spacing of 42% of the radius of the vessel, the electrode spacing is 35.7 inches (0.42×4.1 ft.×12 in/ft×2 cosine of 30°).

In summarizing the graph of FIG. 7, optimum melting and mixing of oxide materials occurs when the average working temperature of the molten material is between the range of about 2000°–4000° F.; when the power density is between the range of about 5–40 $Kw/Ft^2$; when the electrode tip immersion is about 6 inches; and when the electrode spacing from the center axis of the furnace vessel is in the range of about 10–52% of the total average radius of the furnace.

In addition to the tested composition of 54% of $SiO_2$ and 46% of $Al_2O_3$, the graphs of FIG. 7 are applicable to compositions having various percentages of one or more of the following: silicon dioxide, aluminum oxide, titanium dioxide, boron oxide, chromium oxide, ferric oxide, zinc oxide, magnesium oxide, and sodium oxide.

Although not discussed herein with respect to the present invention, it is understood that other furnace related conditions may effect the mixing and melting of oxide compositions. Such conditions include the diameter of the electrode tips and the thickness of the vessel skull.

Based on the foregoing description, a number of advantages of the present invention are readily seen. An electric furnace is provided for discharging a thermally and chemically uniform molten material by means of selected vertical and horizontal positioning of three electrodes together with the application of the proper magnitude of power thereto. In addition, the flow rate of the molten material is optimized. Round electrode tips are used to minimize the amount of heat loss to the vessel side walls and to enhance agitation of the molten material. The use of electric power in the furnace is minimized while proper melting is maintained. The use of the internally cooled electrodes reduces erosion of the electrodes. An open top furnace vessel is included to facilitate movement of the electrodes and to allow for the continuous addition of non-homogeneous batch.

In describing the invention certain embodiments have been used to illustrate the invention and the practice thereof. However, the invention is not limited to the specific embodiments since other embodiments and modifications within the spirit of the invention will readily occur to those skilled in the art. The invention is thus not intended to be limited to the specific embodiments disclosed, but instead it is to be limited only by the claims appended hereto.

What is claimed is:

1. An electric furnace for melting batch material and mixing molten material comprising:

an open-topped vessel for containing molten material and unmelted, non-homogeneous batch on the surface of said molten material, said vessel having a bottom wall with an outlet formed therein for discharging said molten material;

at least three electrodes which are laterally spaced from each other, each of said electrodes having a tip that is immersed in said molten material for conducting electrical current therethrough, each of said electrode tips having a substantially round lateral cross section and each of said electrode tips being positioned above said bottom wall outlet;

individual support arms which mount each of said electrodes, a plurality of elongated vertically extending frame members, vertical carriages supporting each of the support arms on said vertical frame members for movement therealong, first drive means for adjusting the position of each vertical carriage upon its vertical frame member, which drive means, in turn, adjusts the vertical positions of the electrode tips in the molten material;

a plurality of horizontally extending frame members supporting the vertical frame members by means of horizontal carriages for movement along said horizontal frame members, second drive means for adjusting the horizontal position of each horizontal carriage, its vertical frame member, its support arm and its electrode tip along its horizontal frame member, said second drive means being separately and independently operable from said first drive means during furnace operation.

2. The electric furnace of claim 1 further including an at least partially hollow shaft extending from each support arm to each electrode tip, the hollow portion of said shaft defining a fluid passageway for a fluid coolant, fluid inlet means including an inlet tube and an inlet pipe connected thereto, said inlet pipe extending within the hollow portion of said shaft to within one-half inch of the end of said hollow portion, a collar surrounding at least a portion of said partially hollow shaft in the vicinity of the electrode tip to protect said surrounded portion from high temperature erosion.

3. The electric furnace of claim 1 wherein said furnace has an electrode spacing and a tip immersion depth which optimizes melting and mixing of the non-homogeneous batch, said optimum electrode spacing and tip immersion depth varying with a number of furnacing operating parameters including vessel size, magnitude of power applied to said electrodes which determines a power density within the vessel, and the working temperature of the molten material.

4. The electric furnace of claim 3 wherein said first and second drive means are used to adjust the positions of said electrodes for optimum mixing and melting as the furnace operating parameters vary.

5. The electric furnace of claim 3 wherein the optimum electrode tip immersion is about 6 inches as measured from the molten/batch material interface and the optimum electrode spacing lies in a range of from about 10% to about 52% of a total average radius of said vessel.

6. The electric furnace of claim 3 wherein the working temperature of the molten material lies in a range from about 2000° F. to about 4000° F. and the power density in the range from about 5 $Kw/ft^2$ to about 40 $Kw/ft^2$.

7. In a method of melting an oxide and mixing the oxide comprising the steps of:

a. placing a composition of oxides in an electric furnace having a center vertical axis, a bottom wall outlet, and having at least three electrodes with each electrode having an electrode tip;

b. raising the average working temperature of the oxide melt to about 2000° F.–4000° F., the oxide melt forming a melt line;

c. applying power to each of said electrodes to provide a power density to the furnace of between about 5 $Kw/Ft^2$–40 $Kw/Ft^2$;

d. positioning each of said electrode tips vertically about 6 inches below the melt line; and e. positioning each of said electrodes laterally from the center vertical axis of the furnace to between about 10%–52% of the total average radius of the furnace.

8. In the method of claim 7, wherein:

each of said electrode tips is positioned above said furnace outlet.

* * * * *